United States Patent
Ramsey et al.

(10) Patent No.: US 9,237,337 B2
(45) Date of Patent: Jan. 12, 2016

(54) AUTOSTEREOSCOPIC DISPLAY WITH A PASSIVE CYCLOIDAL DIFFRACTIVE WAVEPLATE

(75) Inventors: Robert A. Ramsey, Loveland, CO (US); Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 648 days.

(21) Appl. No.: 13/593,625

(22) Filed: Aug. 24, 2012

(65) Prior Publication Data

US 2013/0050452 A1 Feb. 28, 2013

Related U.S. Application Data

(60) Provisional application No. 61/526,756, filed on Aug. 24, 2011.

(51) Int. Cl.
*H04N 13/00* (2006.01)
*H04N 13/04* (2006.01)
*G09G 3/00* (2006.01)

(52) U.S. Cl.
CPC ....... *H04N 13/0404* (2013.01); *H04N 13/0406* (2013.01); *H04N 13/0468* (2013.01); *G09G 3/003* (2013.01)

(58) Field of Classification Search
CPC .......... H04N 13/0404; H04N 13/0406; H04N 13/0468; G09G 3/003
USPC ........................ 348/51, 54, 58; 345/6; 349/15
See application file for complete search history.

(56) References Cited

U.S. PATENT DOCUMENTS

| 5,347,644 A * | 9/1994 | Sedlmayr ...................... 359/465 |
| 5,896,225 A * | 4/1999 | Chikazawa ................... 359/463 |

(Continued)

FOREIGN PATENT DOCUMENTS

| EP | 0939273 | 1/1999 |
| EP | 0860729 B1 | 7/2006 |

(Continued)

OTHER PUBLICATIONS

Tabiryan et al., "The Promise of Diffractive Waveplates," Optics and Photonics News, vol. 21, Issue 3, pp. 40-45, (Mar. 2010).

(Continued)

*Primary Examiner* — Victor Kostak
(74) *Attorney, Agent, or Firm* — Neil G. J. Mothew (57) ABSTRACT

A new beam deflection approach is provided for displaying images in autostereoscopic format. Conceptually, polarized light from a display is directed into specific viewing regions using a polarization-sensitive beam deflection sub-system that comprises, in exemplary embodiments, an active liquid crystal quarter-wave plate modulator and a passive cycloidal grating element, such as a diffractive waveplate. Specific embodiments may comprise an illumination system that both floods an LCD panel and creates a defined eye pupil region, from within which the display is viewable. Deflecting the pupil region between left and right eye positions in synchronization with displayed frame sequential stereo image data creates desirable autostereoscopic 3D viewing. Other embodiments employ a similar beam deflection sub-system in conjunction with a means of viewing subsets of pixels from different viewing positions, such as a parallax barrier or lenslet array, allowing freedom of head movement while maintaining stereo viewing.

35 Claims, 11 Drawing Sheets

(56) References Cited

U.S. PATENT DOCUMENTS

| | | | |
|---|---|---|---|
| 5,903,388 A * | 5/1999 | Sedlmayr | 359/283 |
| 5,959,664 A | 9/1999 | Woodgate | |
| 6,014,164 A | 1/2000 | Woodgate et al. | |
| 6,061,489 A | 5/2000 | Ezra et al. | |
| 6,075,557 A | 6/2000 | Holliman et al. | |
| 6,108,059 A | 8/2000 | Yang | |
| 6,144,118 A * | 11/2000 | Cahill et al. | 310/12.06 |
| 6,199,995 B1 | 3/2001 | Umemoto | |
| 6,663,254 B2 | 12/2003 | Ohsumi | |
| 6,847,488 B2 | 1/2005 | Travis | |
| 6,870,671 B2 | 3/2005 | Travis | |
| 6,883,919 B2 | 4/2005 | Travis | |
| 7,058,252 B2 | 6/2006 | Woodgate | |
| 7,073,933 B2 | 7/2006 | Gotoh et al. | |
| 7,101,048 B2 | 9/2006 | Travis | |
| 7,215,415 B2 | 5/2007 | Maehara | |
| 7,410,286 B2 | 8/2008 | Travis | |
| 7,430,358 B2 | 9/2008 | Qi et al. | |
| 7,528,893 B2 | 5/2009 | Schultz | |
| 7,545,429 B2 | 6/2009 | Travis | |
| 7,660,047 B1 | 2/2010 | Travis et al. | |
| 7,750,981 B2 | 7/2010 | Shestak et al. | |
| 7,750,982 B2 | 7/2010 | Nelson | |
| 7,944,428 B2 | 5/2011 | Travis | |
| 7,970,246 B2 | 6/2011 | Travis et al. | |
| 7,976,208 B2 | 7/2011 | Travis | |
| 8,016,475 B2 | 9/2011 | Travis | |
| 8,216,405 B2 | 7/2012 | Emerton | |
| 8,354,806 B2 | 1/2013 | Travis | |
| 8,477,261 B2 | 7/2013 | Travis | |
| 2002/0113866 A1 * | 8/2002 | Taniguchi et al. | 348/51 |
| 2003/0137738 A1 | 7/2003 | Ozawa et al. | |
| 2004/0108971 A1 * | 6/2004 | Waldern et al. | 345/8 |
| 2004/0170011 A1 | 9/2004 | Kim et al. | |
| 2004/0263968 A1 * | 12/2004 | Kobayashi et al. | 359/462 |
| 2005/0264717 A1 | 12/2005 | Chien et al. | |
| 2006/0139447 A1 | 6/2006 | Unkrich | |
| 2006/0215129 A1 * | 9/2006 | Alasaarela et al. | 353/94 |
| 2006/0291053 A1 | 12/2006 | Robinson et al. | |
| 2006/0291243 A1 | 12/2006 | Niioka et al. | |
| 2007/0025680 A1 | 2/2007 | Winston et al. | |
| 2007/0115551 A1 | 5/2007 | Spilman et al. | |
| 2007/0115552 A1 | 5/2007 | Robinson et al. | |
| 2008/0084519 A1 | 4/2008 | Brigham et al. | |
| 2008/0086289 A1 | 4/2008 | Brott | |
| 2008/0225205 A1 | 9/2008 | Travis | |
| 2008/0259012 A1 * | 10/2008 | Fergason | 345/89 |
| 2008/0304282 A1 | 12/2008 | Mi et al. | |
| 2008/0316768 A1 | 12/2008 | Travis | |
| 2009/0016057 A1 | 1/2009 | Rinko | |
| 2009/0140656 A1 | 6/2009 | Kohashikawa et al. | |
| 2009/0160757 A1 | 6/2009 | Robinson | |
| 2009/0190079 A1 * | 7/2009 | Saitoh | 349/137 |
| 2009/0225380 A1 | 9/2009 | Schwerdtner et al. | |
| 2010/0053771 A1 | 3/2010 | Travis | |
| 2010/0091254 A1 | 4/2010 | Travis | |
| 2010/0177387 A1 | 7/2010 | Travis | |
| 2010/0188438 A1 | 7/2010 | Kang | |
| 2010/0214135 A1 | 8/2010 | Bathiche | |
| 2010/0220260 A1 | 9/2010 | Sugita et al. | |
| 2010/0231498 A1 | 9/2010 | Large | |
| 2010/0277575 A1 | 11/2010 | Ismael et al. | |
| 2010/0295930 A1 * | 11/2010 | Ezhov | 348/58 |
| 2010/0300608 A1 | 12/2010 | Emerton et al. | |
| 2011/0032483 A1 | 2/2011 | Hruska et al. | |
| 2011/0044056 A1 | 2/2011 | Travis | |
| 2011/0187293 A1 | 8/2011 | Travis | |
| 2011/0188120 A1 | 8/2011 | Tabirian et al. | |
| 2011/0216266 A1 | 9/2011 | Travis | |
| 2011/0242298 A1 | 10/2011 | Bathiche | |
| 2011/0285927 A1 | 11/2011 | Schultz et al. | |
| 2012/0013720 A1 * | 1/2012 | Kadowaki et al. | 348/58 |
| 2012/0127573 A1 | 5/2012 | Robinson et al. | |
| 2013/0101253 A1 * | 4/2013 | Popovich et al. | 385/37 |
| 2013/0135588 A1 * | 5/2013 | Popovich et al. | 353/8 |

FOREIGN PATENT DOCUMENTS

| | | |
|---|---|---|
| EP | 2003394 A2 | 12/2008 |
| JP | 08254617 A | 10/1996 |
| JP | 08340556 A | 12/1996 |
| JP | 2001093321 A | 4/2001 |
| JP | 2002049004 A | 2/2002 |
| JP | 2004319364 A | 11/2004 |
| JP | 2005135844 A | 5/2005 |
| JP | 2005183030 A | 7/2005 |
| JP | 2006004877 A | 1/2006 |
| JP | 2006031941 A | 2/2006 |
| JP | 2008204874 A | 9/2008 |
| KR | 1020030064258 | 7/2003 |
| KR | 1020110006773 A | 1/2011 |
| KR | 1020110017918 A | 2/2011 |
| KR | 1020110067534 A | 6/2011 |
| KR | 1020120048301 A | 5/2012 |

OTHER PUBLICATIONS

International search report and written opinion of the international searching authority from PCT/US12/52189 dated Jan. 29, 2013.

U.S. Appl. No. 13/300,293 to Robinson et al. entitled "Directional flat illuminators" filed Nov. 18, 2011 (commonly-owned).

International search report and written opinion of international searching authority in PCT/US2012/042279 dated Feb. 26, 2013.

Kalantar, et al. "Backlight Unit With Double Surface Light Emission," J. Soc. Inf. Display, vol. 12, Issue 4, pp. 379-387 (Dec. 2004).

International Preliminary Report on Patentability in PCT/US2011/061511 dated May 21, 2013.

Travis, et al. "Backlight for view-sequential autostereo 3D".

International Search Report & Written Opinion for PCT/US12/37677 dated Jun. 29, 2012.

International Search Report & Written Opinion for PCT/US11/61511 dated Jun. 29, 2012.

International search report and written opinion of international searching authority for co-pending PCT application No. PCT/US2013/041192 mailed Aug. 28, 2013.

International search report and written opinion of international searching authority for co-pending PCT application No. PCT/US2013/041619 mailed Aug. 27, 2013.

International search report and written opinion of international searching authority for co-pending PCT application No. PCT/US2013/041655 mailed Aug. 27, 2013.

International search report and written opinion of international searching authority for co-pending PCT application No. PCT/US2013/041703 mailed Aug. 27, 2013.

International search report and written opinion of international searching authority for co-pending PCT application No. PCT/US2013/041548 mailed Aug. 27, 2013.

International search report and written opinion of international searching authority for co-pending PCT application No. PCT/US2013/041683 mailed Aug. 27, 2013.

International search report and written opinion of international searching authority for co-pending PCT application No. PCT/US2013/041228 mailed Aug. 23, 2013.

International search report and written opinion of international searching authority for co-pending PCT application No. PCT/US2013/041235 mailed Aug. 23, 2013.

International search report and written opinion of international searching authority for co-pending PCT application No. PCT/US2013/041697 mailed Aug. 23, 2013.

* cited by examiner

AUTOSTEREOSCOPIC DISPLAY WITH A PASSIVE CYCLOIDAL DIFFRACTIVE WAVEPLATE

CROSS-REFERENCE TO RELATED APPLICATIONS

The present application claims priority to U.S. Provisional Pat. App. Ser. No. 61/526,756, filed Aug. 24, 2011, and entitled "Auto-stereoscopic display with a passive cycloidal diffractive waveplate."

TECHNICAL FIELD

Generally, this disclosure relates to autostereoscopic displays, and more specifically relates to beam deflection approaches for displaying images in autostereoscopic displays.

BACKGROUND

A spatially multiplexed autostereoscopic display system typically has either a lenticular screen or a parallax barrier. The concept of lenticular screens and parallax barrier type approaches to spatially multiplexed autostereoscopic images are over 100 years old. Each of these approaches allows for each eye to only see a portion of the image, which is particular to either the left or right eye frame sequential stereo image data.

Figure 1:
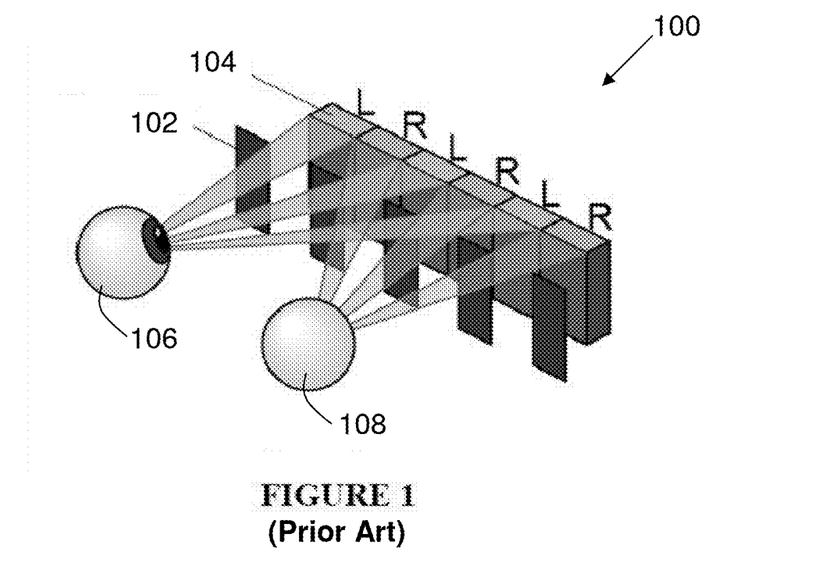
FIG. 1 is a schematic diagram showing an example of a parallax-barrier type display.

FIG. 1 is a schematic diagram 100 showing an example of a parallax-barrier type display. A parallax barrier 102 is a device placed in front of an image source 104, such as a liquid crystal display (LCD), to allow it to show a stereoscopic image without the need for the viewer to wear 3D glasses. Placed in front of the normal LCD, the parallax barrier 102 includes a layer of material with a series of precision slits, allowing each of the left eye 106 and right eye 108 to see a different set of pixels, thus creating a sense of depth through parallax. A disadvantage of the technology is that the viewer generally has to be positioned in a well-defined location to experience the 3D effect. Another disadvantage to parallax-barrier type displays is that the effective horizontal pixel count viewable for each eye is reduced by one-half.

Figure 2:
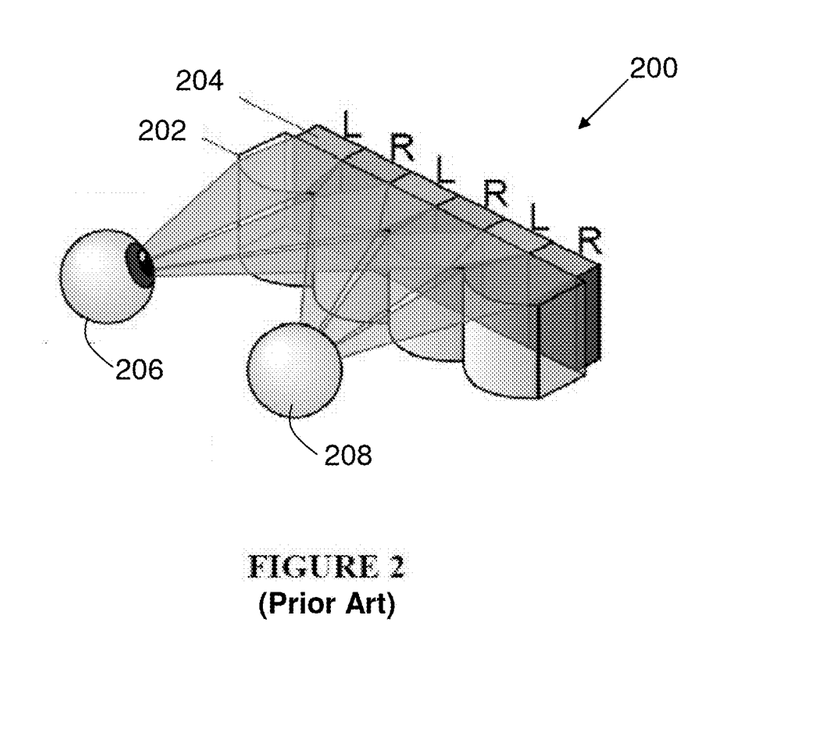
FIG. 2 is a schematic diagram showing an example of a lenticular lens type display.

FIG. 2 is a schematic diagram 200 showing an example of a lenticular lens type display. A lenticular lens 202 is an array of cylindrical lenses, designed so that when viewed from slightly different angles, only certain pixels are visible. FIG. 2 shows how when a lenticular lens array 202 is applied to a pixilated screen 204, it can produce an autostereoscopic view, providing alternate imagery for the left eye 206 and right eye 208. Similar to the barrier approach, lenslet systems require the viewer to accurately position his or her head; though unlike barrier approaches, little light is lost, yielding higher efficiency.

Unfortunately, both the parallax barrier and lenticular lens array technologies have fabrication procedures that demand precision alignment of the optic to the TFT and color filter planes. Accordingly, what is needed in the art is a spatially multiplexed autostereoscopic display technique that provides the autostereoscopic 3D visual effect desired, but does not suffer from the deficiencies of conventional approaches.

BRIEF SUMMARY

To overcome the deficiencies of conventional approaches, the present disclosure provides for a new beam deflection approach for displaying images in autostereoscopic format.

Conceptually, light from a display is directed into specific viewing regions using a polarization-sensitive beam deflection subsystem, which may comprise, for example, an active liquid crystal (LC) quarter-wave plate modulator and a passive cycloidal grating element (e.g., diffractive waveplate). Such a beam deflection system is then combined with a means for viewing subsets of pixels, based on polarization, from different viewing positions. Some exemplary embodiments comprise an illumination system that both floods an LCD panel and creates a defined eye pupil region, from within which the display is viewable. Deflecting the pupil region between left and right eye positions in synchronization with displayed frame sequential stereo image data creates a desired autostereoscopic 3D sensation. Other embodiments may employ a similar polarization-sensitive beam deflection subsystem in conjunction with a means of viewing subsets of pixels from different viewing positions, such as a parallax barrier or lenslet array, allowing freedom of head movement while maintaining stereo viewing. Additional embodiments would utilize an emissive display technology such as OLED (Organic Light Emitting Device) in combination with active polarization control and a polarization beam deflection subsystem.

In one embodiment, an exemplary autostereoscopic display system for providing stereoscopic imagery may comprise a display panel for providing stereoscopic imagery. Such a display panel may be illuminated using common LCD-based illumination systems, or may employ an emissive illumination source, such as organic LEDs. Exemplary embodiments may also include a polarization modulator for modifying the polarization of light received from the display panel. Such modification may comprise imparting left-handed and right-handed circular polarization on the light received. Additionally, such embodiments may further comprise a polarization-sensitive beam deflector, which may be comprised of a static cycloidal diffractive waveplate configured to respectively direct the left- and right-handed circular polarized light into either left or right eye viewing regions based on the handedness of the circular polarized light. Also, such systems may further comprise a means for viewing subsets of pixels provided by the beam deflector from different viewing positions. An exemplary embodiment may comprise a parallax barrier or lenslet array, but other approaches are also employable.

In a more specific embodiment, an exemplary autostereoscopic display system for providing stereoscopic imagery may comprise a linear polarizer configured to linearly polarize light output from a display panel providing stereoscopic imagery, and a polarizing modulator, such as a liquid crystal modulator, configured to impart right-handed or left-handed circular polarization using positive or negative quarter-wave phase retardance on linearly polarized light received from the linear polarizer. The left- and right-handed circular polarized light correspond to either left eye or right eye images of the stereoscopic imagery. Such embodiments may also comprise a polarization-sensitive beam deflector, such as a static cycloidal diffractive waveplate comprising diffraction angles determined as a function of wavelength of the left-handed and right-handed circular polarized light. Accordingly, the static cycloidal diffractive waveplate is configured to respectively direct the left- and right-handed circular polarized light into either left or right eye viewing regions based on the handedness of the circular polarized light. Also, such systems may further comprise a means for viewing subsets of pixels provided by the beam deflector from different viewing positions, such as a parallax barrier, lenslet array, or other suitable means.

In another aspect, methods for providing autostereoscopic imagery are also disclosed herein. In exemplary embodiments, such methods may comprise linearly polarizing light output from an illumination system of an autostereoscopic display. In addition, such methods may also comprise modulating the polarization of received light, such as the linearly polarized light, for example, by imparting right-handed or left-handed circular polarization on the received polarized light. Such exemplary methods may further comprise directing the left-handed and right-handed circularly polarized light respectively into either left or right eye viewing regions based on the handedness of the circular polarized light. Exemplary methods may even further include directing the left-handed and right-handed circularly polarized light in such a way as to allow for viewing subsets of pixels provided by the beam deflector from different viewing positions, such as by employing a parallax barrier, lenslet array, or other suitable means.

DETAILED DESCRIPTION

A static (i.e., passive) cycloidal diffractive waveplate (CDW) is an optical component which may be approximately a micron-thick with diffraction efficiency as high as a Bragg grating (~100%), but with a spectrum of wavelengths and divergence angles that are two to three orders broader. Typical CDW devices are fabricated utilizing photo-alignment layers that are exposed to two coherently orthogonal circular polarized beams generating a specific intensity pattern, which is imprinted into the alignment layer, and which then has a layer of reactive mesogen (polymerizable liquid crystal material) material spin coated on and fixated with standard processing.

Figure 3:
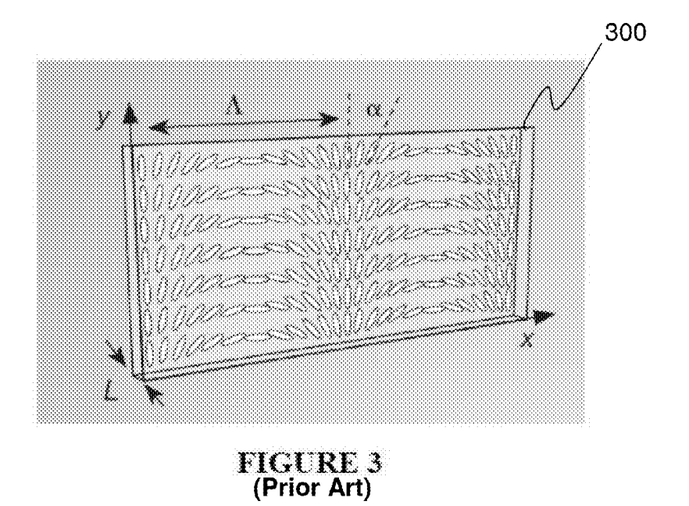
FIG. 3 is a schematic diagram illustrating liquid crystal optical axis orientation of a cycloidal diffractive waveplate (CDW), with L being film thickness and α and Λ being functions of exposure wavelength and incident angles, in accordance with the present disclosure.

FIG. 3 is a schematic diagram illustrating liquid crystal optical axis orientation of a cycloidal diffractive waveplate 300, with L being film thickness, α and Λ being functions of exposure wavelength and incident angles. FIG. 3 illustrates a conventional cycloidal diffractive waveplate 300 and the optical axis orientation of the reactive mesogen layer. In this pictorial, typical parameters are illustrated that define the spectral operational region of the grating, namely, the grating period Λ, which is a function of the exposure parameters (incident angles) of the photo-alignment layer. By adjusting the exposure conditions, such as exposure wavelength, incident angle and polarization handedness, one can create a cycloidal diffractive waveplate that can be used across the visible spectrum or approximately the range of 400-700 nm. A typical CDW diffracts a circular polarized beam into either the $+1^{st}$ or $-1^{st}$ order, depending on its handedness. For an input beam of linear polarization, both orders are present. This effect is depicted in FIGS. 4a-4c, where typical diffraction patterns are seen for both left-handed and right-handed polarization inputs, as well as a linear polarized input.

Figure 4A:
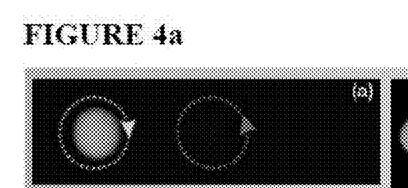
FIG. 4a is a schematic diagram showing effects of input polarization on diffracted light for left-handed circular polarized input, in accordance with the present disclosure.
Figure 4B:
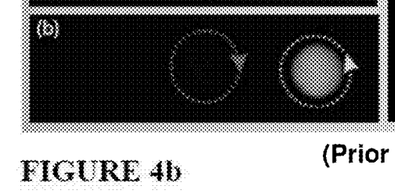
FIG. 4b is a schematic diagram showing effects of input polarization on diffracted light for right-handed circular polarized input, in accordance with the present disclosure.
Figure 4C:
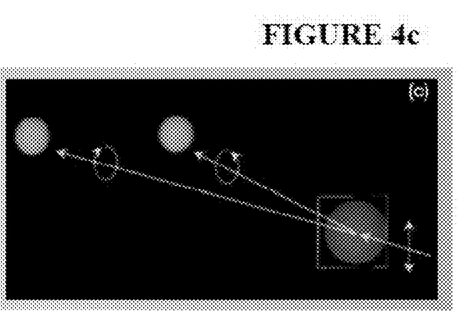
FIG. 4c is a schematic diagram showing effects of input polarization on diffracted light for linear polarized light input, in accordance with the present disclosure.

FIG. 4a is a schematic diagram showing effects of input polarization on diffracted light for left-handed circular polarized input. FIG. 4b is a schematic diagram showing effects of input polarization on diffracted light for right-handed circular polarized input. FIG. 4c is a schematic diagram showing effects of input polarization on diffracted light for linear polarized light input. These diffraction efficiencies for circular polarized light can reach up to 100% efficiency. It is this specific operational characteristic that can be utilized to displace the output light beam from a display system and generate autostereoscopic images or be utilized for sub-pixel directional control.

The combination of a polarization modulator, static cycloidal diffractive waveplate and time sequential stereo image data would allow for full resolution autostereoscopic display systems. Combining the same beam deflection aspect with lens (or barrier) based autostereo displays would also allow systems that are more tolerant of viewer head position. The present disclosure details the addition of a variable +/−quarter wave retarder along with a static cycloidal diffractive waveplate to a liquid crystal display (LCD) for use with full resolution autostereoscopic displays.

Figure 5:
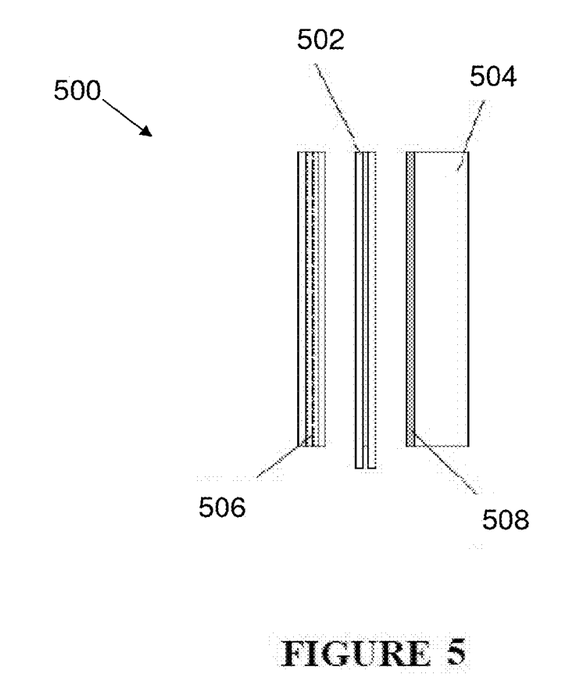
FIG. 5 is a schematic diagram showing the detail of an autostereoscopic display utilizing a static cycloidal diffractive waveplate, in accordance with the present disclosure.

FIG. 5 is a schematic diagram showing the detail of an autostereoscopic display 500 utilizing a static cycloidal diffractive waveplate, in accordance with the disclosed principles. Illustrated is an LC modulator 502, which may be fabricated with flexible substrates, glass substrates, and so on. In operation, the LC modulator 502 receives light from a display panel 504, such as an LCD panel, and creates either right-handed or left-handed circular polarization. Examples of a circular LC modulator can be an in-plane switching device, such as a surface stabilized ferroelectric device that reorients a quarter-wave (QW) retardance through approximately a right angle approximately symmetrically about the input linear polarization direction. Another alternative device comprises two orthogonally oriented QW modulators similar to those operated in cinema 3D systems. An example of a cost effective modulator is an approximately 45° oriented half-wave LC modulator (OCB (Optically compensated blend) device or an ECB (electrically controlled birefringence) device), and an approximately orthogonally oriented passive quarter-wave retarder. The static cycloidal diffractive waveplate (CDW) 506 is located after the LC modulator 502, and is configured to direct light in certain directions based on the handedness of the circular polarization imparted by the LC modulator 502, as described in further detail below. An exit polarizer 508 may also be provided, if needed, between the display panel 504 and the LC modulator 502. The exit polarizer 508 may be employed to linearly polarize light emitted from the display panel 504 prior to entering the LC modulator 502.

Figure 6:
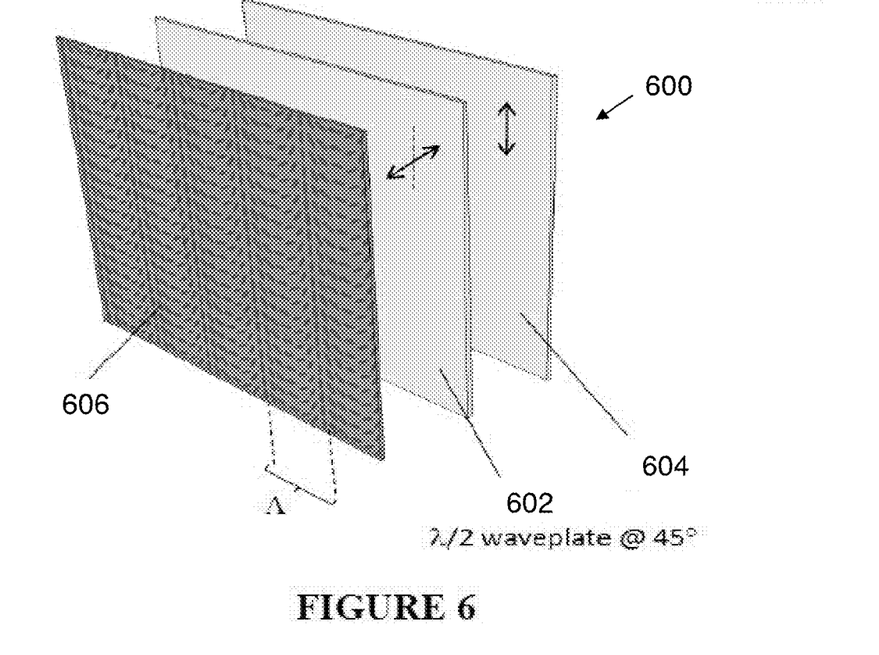
FIG. 6 is a schematic diagram showing a display system, and the respective orientation of exit polarization for LCD, slow-axis of LC modulator and grating orientation of CDW, in accordance with the present disclosure.

FIG. 6 is a schematic diagram showing another embodiment of a display system 600 in accordance with the disclosed principles, and the respective orientation of an exit polarizater 604 for an LCD, slow-axis of an LC modulator 602 (buff direction), and grating orientation of a CDW 606. The orientation of the LC modulator 602 and the cycloidal diffractive waveplate 606 are important to the operational aspect of the autostereoscopic display. This orientational stack-up allows for the generation of both right-handed and left-handed circular polarized light, which then passes through the CDW 606.

The generation of left-handed and right-handed circular polarized light is important to the operation of the CDW 606 for autostereoscopic display. The input polarization to the LC modulator 602 is typically linear polarized light oriented at approximately 45° to the buff direction of the LC modulator 602. The LC modulator 602 can impart a phase retardation of approximately $+\lambda/4$ or $-\lambda/4$ depending on the applied voltage. This in turn will generate either left- or right-handed circular polarized light.

Figure 7:
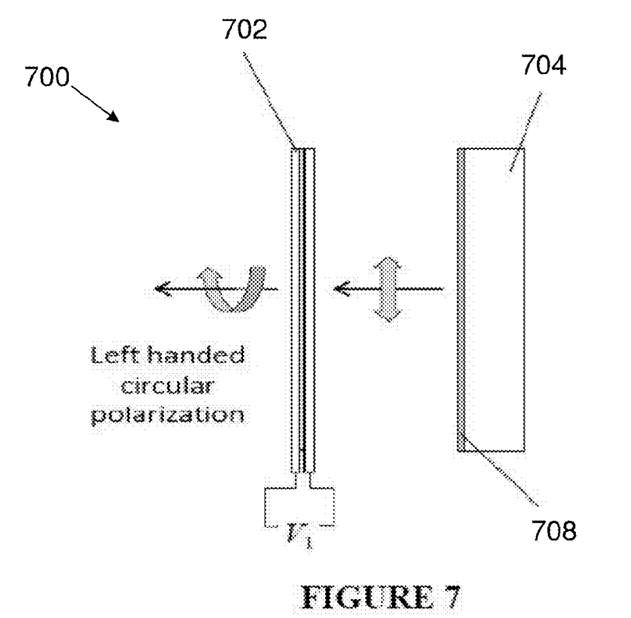
FIG. 7 is a schematic diagram showing exemplary generation of left-handed circular polarization with LC modulator, in accordance with the present disclosure.

FIG. 7 is a schematic diagram showing exemplary generation 700 of left-handed circular polarization with an LC modulator 702. As depicted in FIG. 7, the generation of left-handed circular polarized light occurs by receiving linearly polarized light (via linear polarizer 708) from a display panel 704, and adjusting the LC modulator 702 to a first specific voltage $V_1$. At approximately $V_1$ the phase retardation of the LC modulator 702 is that which imparts approximately $+\lambda/4$ retardation generating a polarization state of left-handed circular polarized light.

Figure 8:
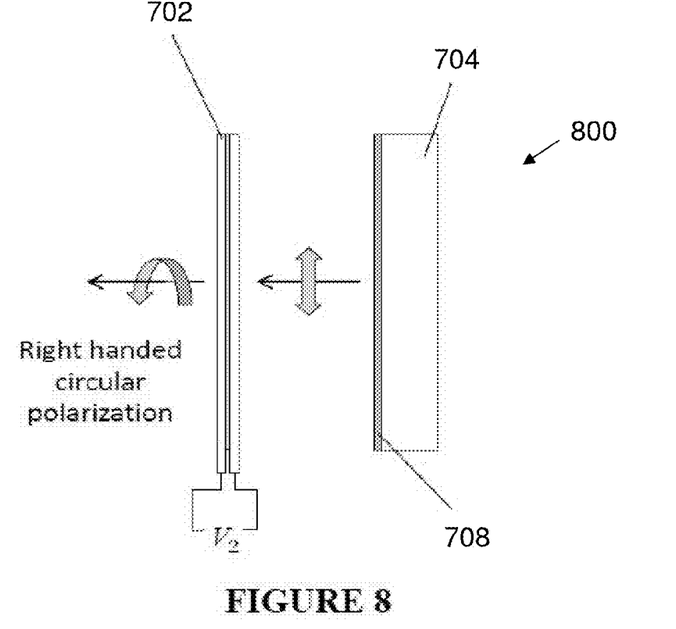
FIG. 8 is a schematic diagram showing exemplary generation of right-handed circular polarization with LC modulator, in accordance with the present disclosure.

FIG. 8 is a schematic diagram showing exemplary generation 800 of right-handed circular polarization with the LC modulator 702. FIG. 8 shows the generation of right-handed circular polarized light with the LC modulator 702 now operating at a second specific voltage $V_2$. Once the generation of handed polarization has been achieved by the LC modulator 702, this light then transverses the CDW (906, FIGS. 9 and 10), which directs the light into two different viewing windows depending on the handedness of the polarized light. This diffraction due to handedness is depicted in FIG. 9 and FIG. 10.

Figure 9:
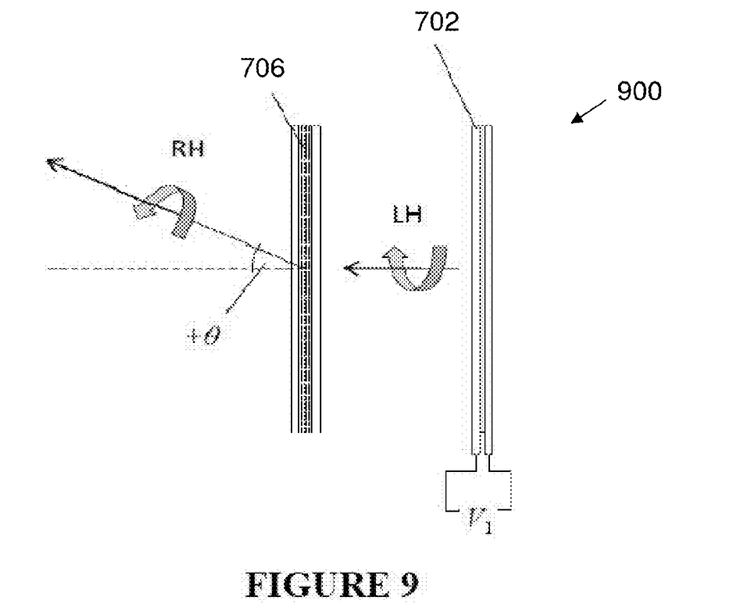
FIG. 9 is a schematic diagram illustrating diffraction of left-handed circular polarized light by a passive CDW, in accordance with the present disclosure.
Figure 10:
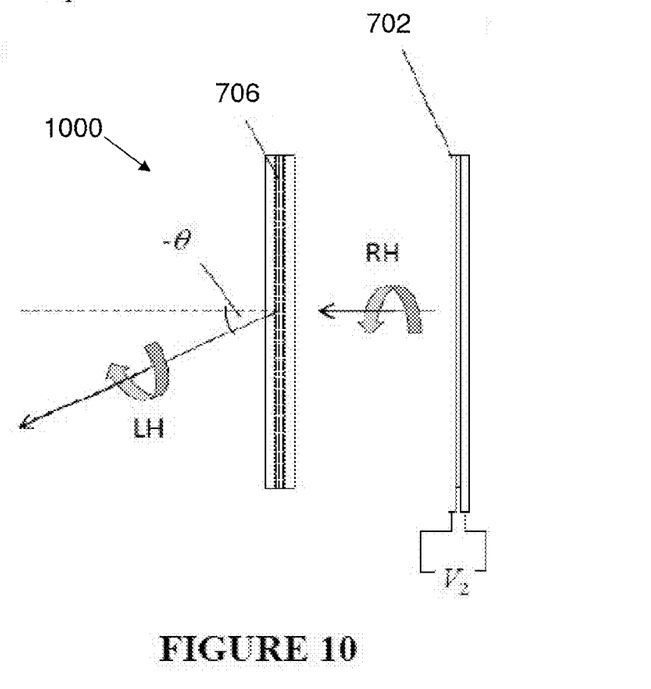
FIG. 10 is a schematic diagram illustrating diffraction of right-handed circular polarized light by a passive CDW, in accordance with the present disclosure.

FIG. 9 is a schematic diagram 900 illustrating diffraction of left-handed circular polarized light by a passive CDW 706, and FIG. 10 is a schematic diagram 1000 illustrating diffraction of right-handed circular polarized light by the passive CDW 706, both in accordance with the disclosed principles. Here we see the diffraction of left-handed circular polarized light into right-handed circular polarized light at an angle of approximately $+\theta$, and right-handed circular polarized light into left-handed circular polarized light at an angle of approximately $-\theta$. These diffraction angles ($\theta$) may be determined by the CDW 706 fabrication process and are a function of wavelength. The CDW 706 may be optimized to allow for the viewing window performance across the display area.

By gaining the ability to steer the output image into different viewing windows, one is able to mimic the use of a lenticular lens or parallax barrier without the complexity of alignment during the fabrication process. Utilizing time sequential stereo image data along with the LC modulator, each image frame can be directed to the appropriate viewing window, left images to the left eye and right images to the right eye. This timed sequence of events is illustrated in FIG. 11.

Figure 11:
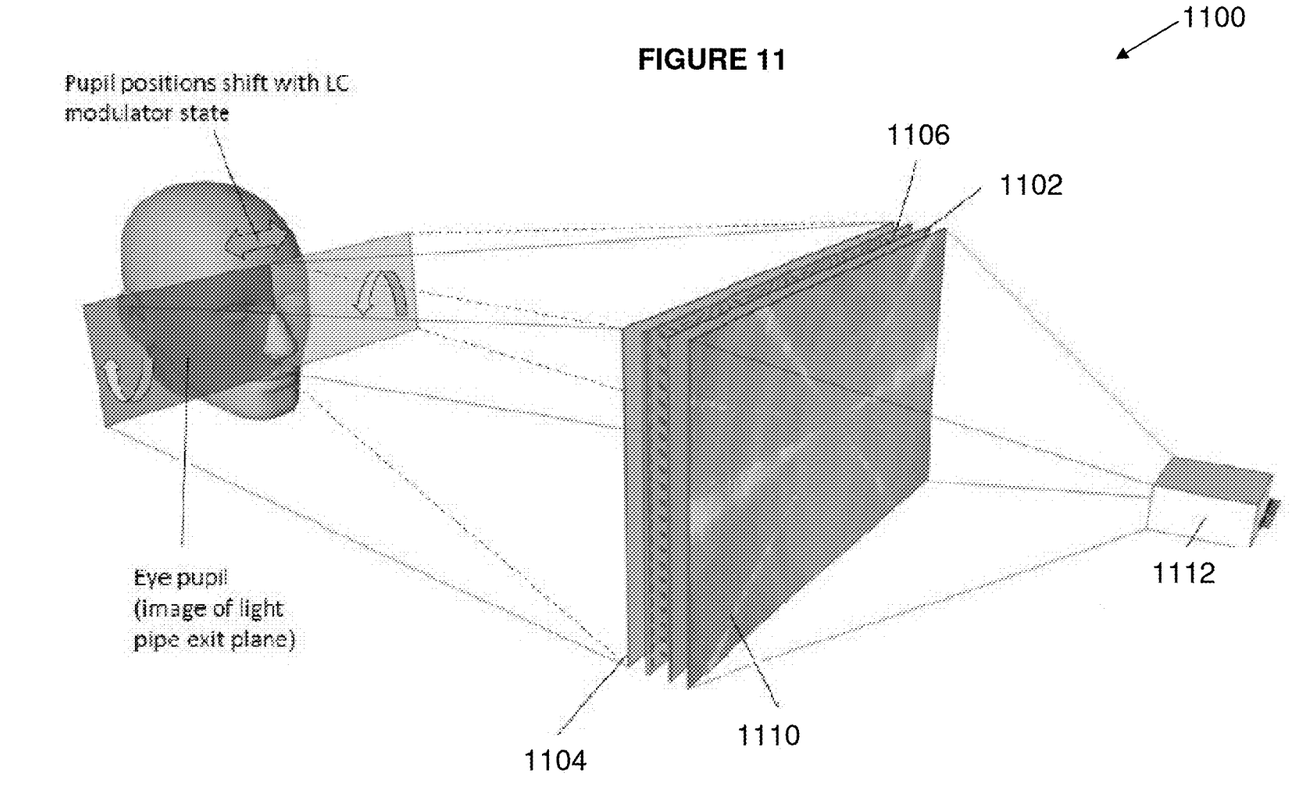
FIG. 11 is a schematic diagram illustrating an autostereoscopic viewing system, showing generation of autostereoscopic viewing windows utilizing a passive CDW, in accordance with the present disclosure.

FIG. 11 is a schematic diagram illustrating an autostereoscopic viewing system 1100, showing generation of autostereoscopic viewing windows utilizing a passive CDW 1106 also in accordance with the disclosed principles. Here, we see the effect of the LC modulator 1102 and the static CDW 1106 on image shift. The right eye image data may be generated by creating left-handed circular polarized light with the LC modulator 1102. This is then converted to right-handed polarized light and diffracted at an angle of approximately $-\theta 0$ to the right eye. The next image sequence is for the left eye, and thus the LC modulator 1102 may be adjusted to generate right-circular polarized light which then is converted to left-circular polarized light and diffracted at an angle of approximately $+\theta$ to the left eye after encountering the CDW 1106. Additionally, FIG. 11 demonstrates the use of a passive CDW 1106 for autostereoscopic display using an LED/Fresnel lens (1110/1112) arrangement to generate near-collimated light that passes through the LC modulator/CDW (110/1106) arrangement. In this embodiment, the lens forms an image of the source at the viewing distance from the display forming an eye pupil region. When a viewer's eye falls into this region, the entire display is viewed. One effect of the CDW 1106 and LC 1102 modulator may be to deflect the eye pupil between the eye position in substantial synchronization with displayed left and right eye stereoscopic images.

Figure 12:
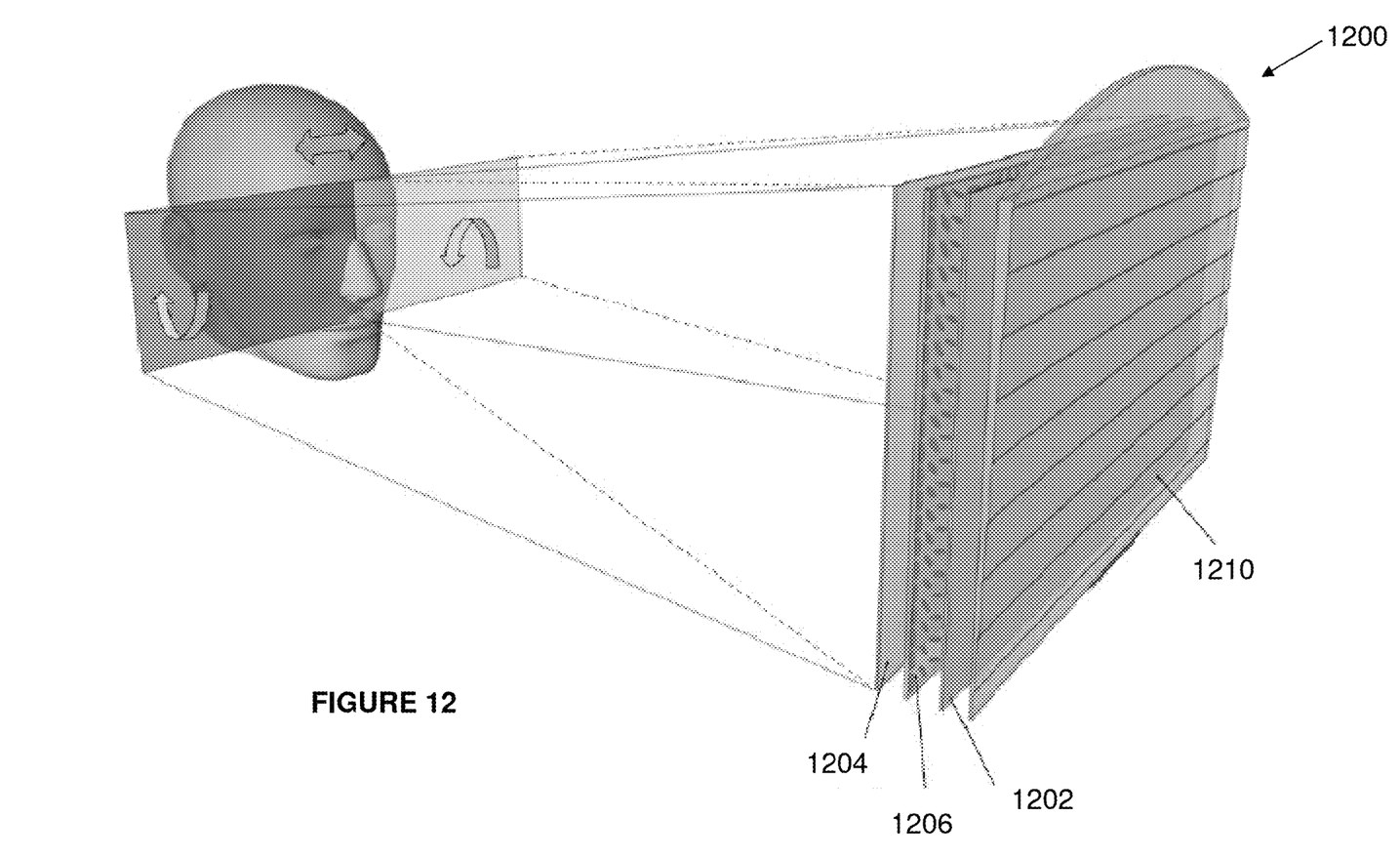
FIG. 12 is a schematic diagram illustrating an autostereoscopic viewing system, showing use of folded collimating backlight for generation of autostereoscopic viewing windows utilizing a passive CDW, in accordance with the present disclosure.

FIG. 12 is a schematic diagram illustrating another embodiment of an autostereoscopic viewing system 1200 in accordance with the disclosed principles. Specifically, an LC modulator 1202 is again employed to impart left-handed and right-handed polarization on incoming light. An LCD display 1204 is used to provide the stereoscopic imagery, along with a folded collimating backlight 1210 for generation of autostereoscopic viewing windows. As before, a passive CDW 1206 is employed to direct the circularly polarized light from the LC modulator 1202 based on the handedness of the light. Such embodiments employ a folded optical system, for example, as taught in commonly-owned U.S. patent application Ser. No. 13/300,293, filed Nov. 18, 2011, to Michael Robinson et al., entitled "Directional flat illuminators," which is herein incorporated by reference in its entirety.

Figure 13:
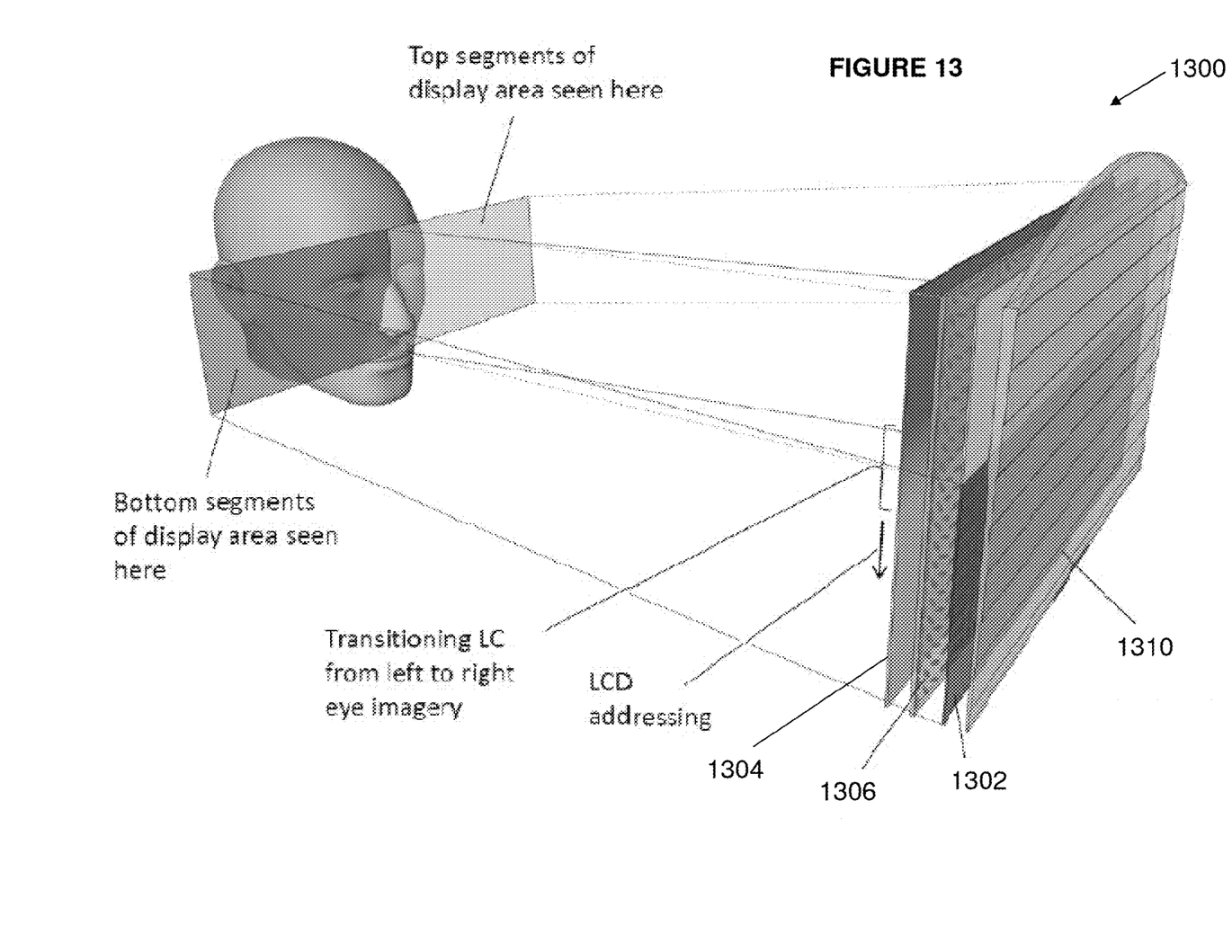
FIG. 13 is a schematic diagram illustrating an autostereoscopic viewing system, in accordance with the present disclosure.

FIG. 13 is a schematic diagram illustrating another embodiment of an autostereoscopic viewing system 1300 in accordance with the disclosed principles. The autostereoscopic viewing system 1300 shown in FIG. 13 is a more practical version of the system 1200 illustrated in FIG. 12, and again includes an LC modulator 1302 and a CDW 1306, but now includes a segmented LCD display panel 1304. Such displays use an active matrix backplane that are updated line-by-line in a scrolling manner. Generally, an entire left or right eye image may not be produced; instead there is a continuously moving region of the display in which alternate images transition. If above this region a right eye image is forming, then below is a settled left eye image. Modulating these regions separately with a vertically segmented LC modulator 1302 directs the light from these regions into the correctly corresponding eyes, avoiding what would otherwise be unacceptable mixing of imagery. The finite transition region allows for a moderate number of segments, for example 10, to be defined with acceptable performance. In a continuously illuminated system, for example, employing a segmented collimated backlight 1310, the mixed imagery within the transition region may be directed to both left and right eyes equally yielding a small, but acceptable amount of mixing between images. To reduce this mixing, it is possible to introduce a scrolling illuminator, where a darkened band follows the transition regions, reducing its visibility.

Figure 14:
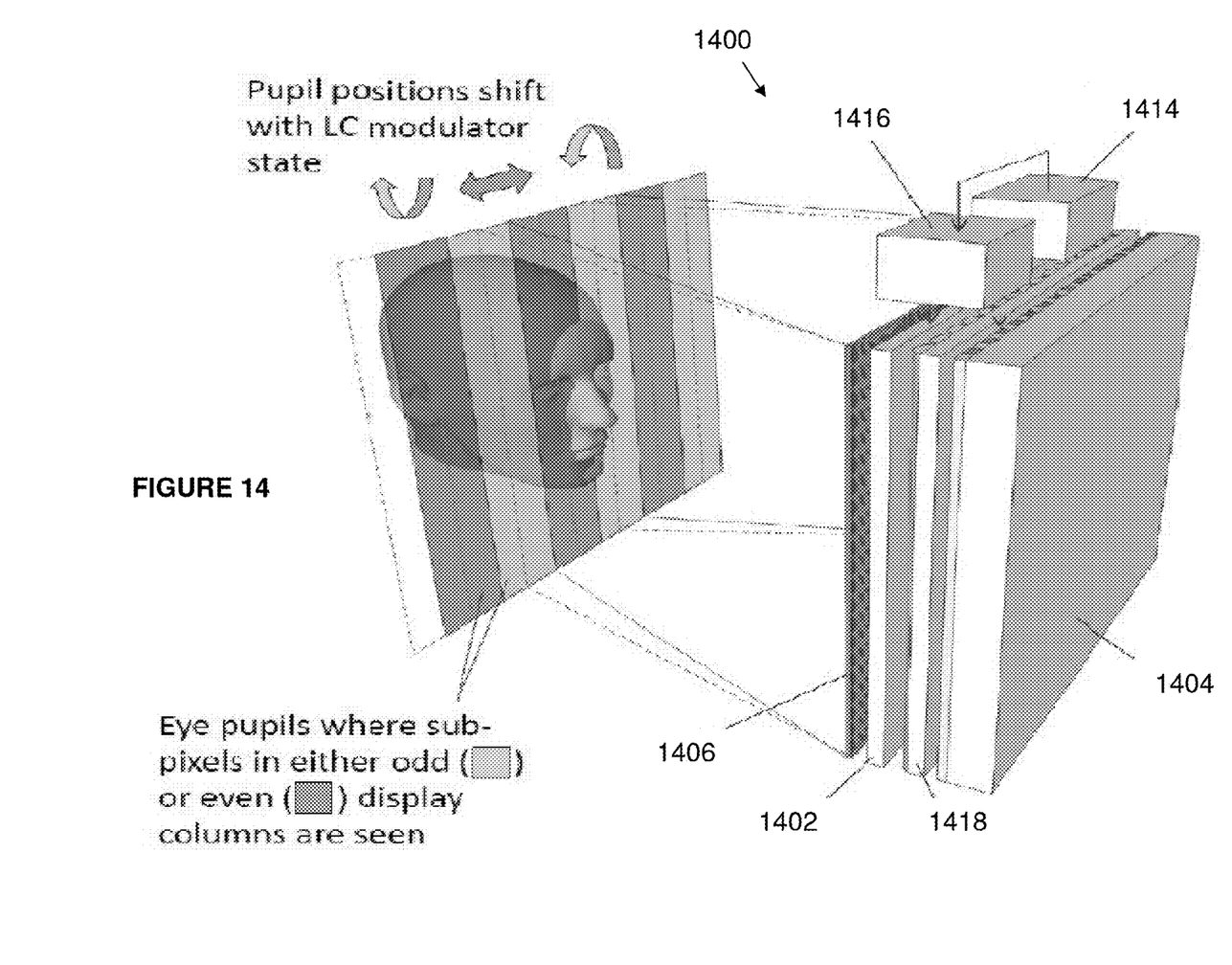
FIG. 14 is a schematic diagram illustrating another embodiment of an autostereoscopic viewing system, in accordance with the present disclosure.

FIG. 14 is a schematic diagram illustrating another embodiment of an autostereoscopic viewing system 1400 in accordance with the disclosed principles. This system 1400 is applicable to any underlying display technology as it does not require specific illumination, relying instead on the imaging of light providing pixels with cylindrical lenslets (or barriers) as a lenticular array 1418. As briefly discussed above, a conventional two-view autostereoscopic display employs vertical lenses that image odd columns of the display to one region in the plane of the viewers' eyes, while simultaneously imaging even columns to an adjacent region. Using eye tracking camera(s) 1414, or other eye tracking devices, along with control circuitry 1416, the eyes or one or more viewers may be tracked for location in front of the display panel 1404. Placing right and left eye pixel information on alternate columns in such an array 1418 allows stereoscopic imagery to be seen correctly by the viewer when his or her eyes reside in the adjacent eye pupil regions. The periodicity of the optical system replicates these regions, forming an array of eye pupils in which alternate left and right eye images can be seen. In this embodiment, movement of the viewer's head by a distance of approximately 65 mm, roughly equal to eye separation, causes reversal of the imagery and leads to undesirable pseudoscopic stereo. Introducing a beam deflector in the form of an LC modulator 1402 and CDW 1406 plate as taught herein can compensate for the head movement by repositioning the eye pupils.

Figure 15:
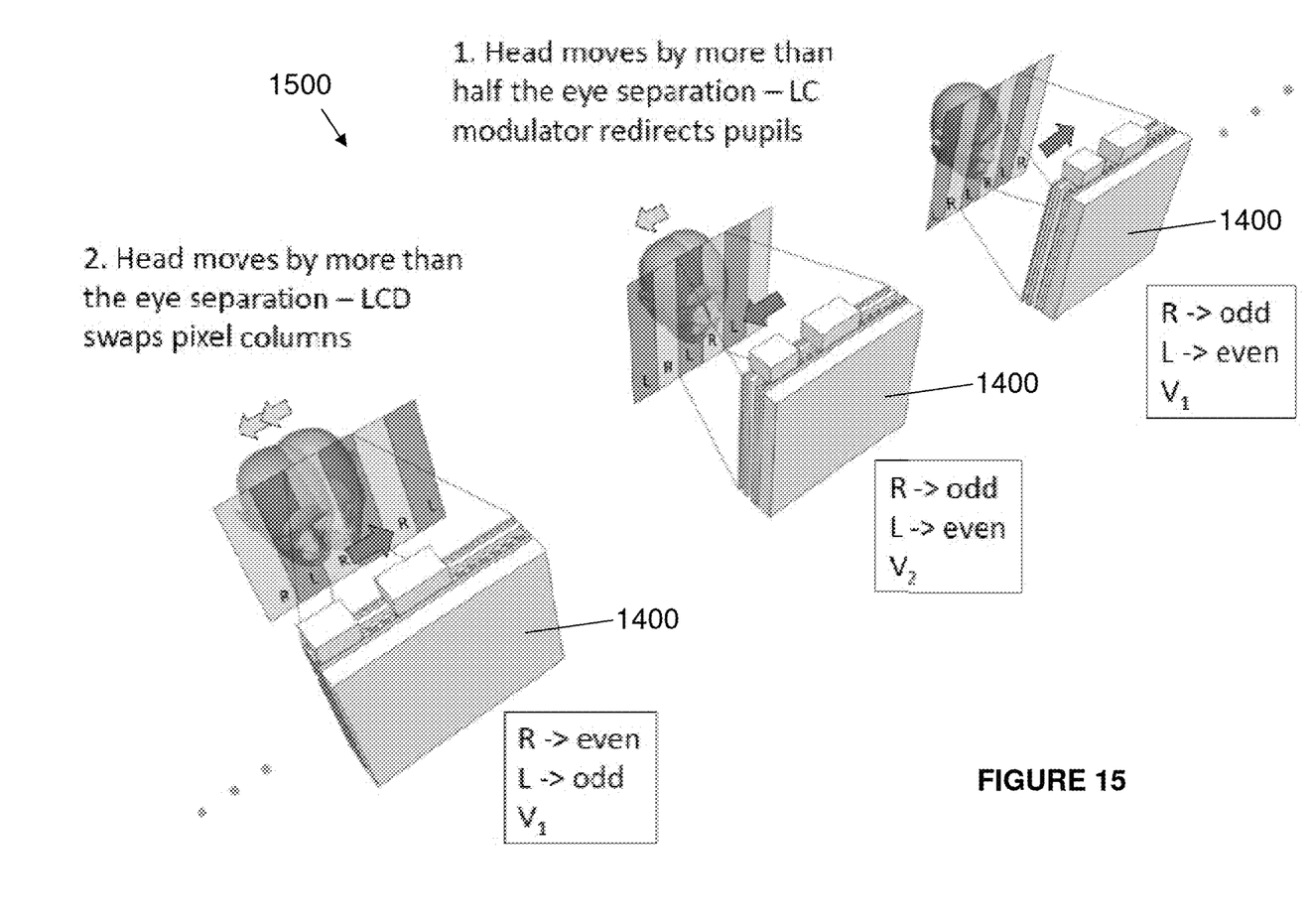
FIG. 15 is a schematic diagram illustrating the operation of the embodiment shown in FIG. 14, in accordance with the present disclosure.

FIG. 15 is a schematic diagram 1500 illustrating the operation of the embodiment of the autostereoscopic system 1400 illustrated and described in FIG. 14. The CDW beam deflector sub-system is designed to deflect the eye pupils by a distance equivalent to approximately half their width. Should the viewer's head move sideways, the beam deflector shifts the pupils before the viewer experiences any drop off in intensity close to the pupil boundaries. With further head movement, the deflector resets the pupil positions in substantial synchronization with swapping the column data of the display, effectively re-directing left and right eye images. Since the eye never approaches pupil boundaries, any intensity variation is avoided.

The operation described in FIG. 15 assumes a globally addressed display panel which has the ability to flip all column data simultaneously and in synchronization with altering the state of the beam deflector LC modulator. This may be fabricated by employing emissive display technology such as organic emitting LED technology (OLED). If, however, a line-by-line addressed display panel is used, then a segmented modulator may be employed as described earlier to ensure correct imagery is directed to the correct pupil position during the column-flip update of the panel. In any case, any appropriate illumination technology, either now existing or later developed, may be employed with the principles of providing autostereoscopic imagery disclosed herein.

Figure 16:
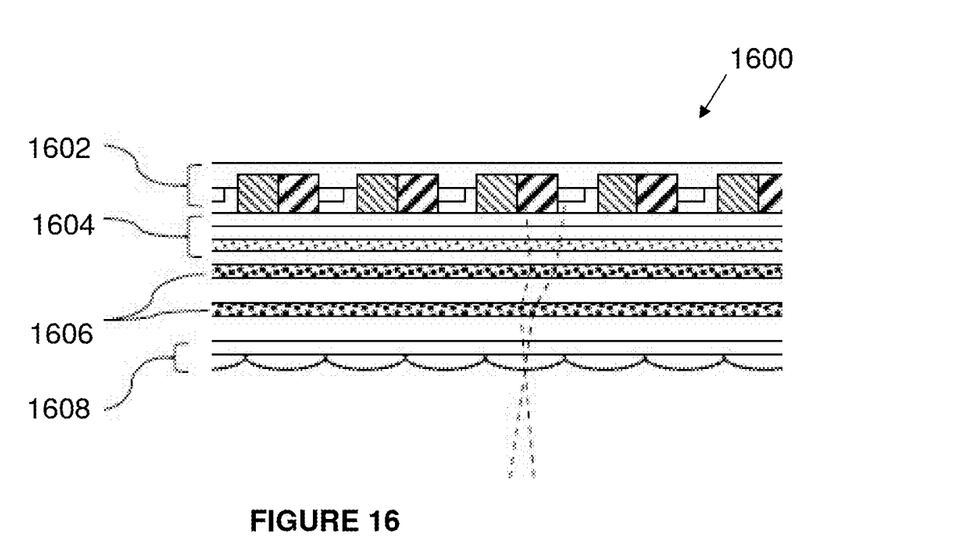
FIG. 16 is a schematic diagram illustrating yet another embodiment of an autostereoscopic viewing system, in accordance with the present disclosure.

Looking at FIG. 16, illustrated is a schematic diagram of another embodiment of a display system constructed in accordance with the disclosed principles. In this embodiment, an OLED array is used as the illumination source of the display panel 1602. Alternatively, any other type of emissive illumination technology, either now existing or later developed, may also be employed with the disclosed principles. FIG. 16 also includes an active LC polarization modulator 1604, as discussed above, and may again be operated in either ECB or OCB mode. In this embodiment, however, a pair of cycloidal diffractive waveplates 1606 is employed in the autostereoscopic display system. A lenticular lens array 1608 is also illustrated in the system 1600 of FIG. 16, which may again be lenslet array as discussed above. As also described above, the lenticular lens array 1608 allows the viewing of subsets of pixels by a viewer from varying positions, while maintaining the autostereoscopic effect. Alternatively, a parallax barrier or other similarly performing device may be employed.

Figure 17:
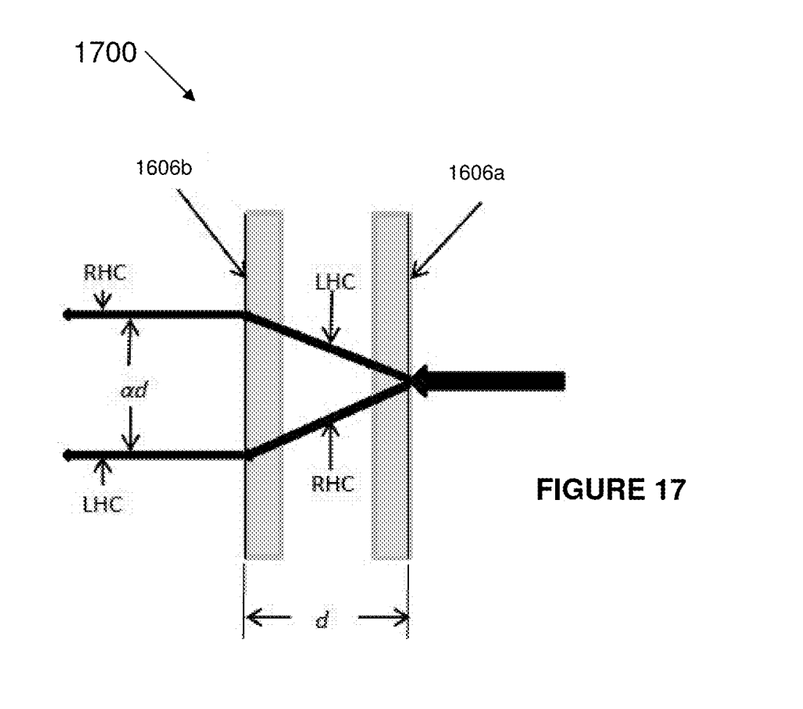
FIG. 17 is a schematic diagram providing close up view of the operation of a pair of CDWs in an autostereoscopic viewing system.

Turning now to FIG. 17, illustrated is a schematic diagram 1700 providing close up view of the operation of a pair of CDWs in an autostereoscopic system, such as the CDW pair 1606 illustrated in FIG. 16. In such embodiments, a first of the two opposite-faced CDWs 1606a is oriented 180 degrees to the second CDW 1606b, such that the emitted beams of left-handed and right-handed polarized light may be displaced. The displacement is correlated by a separation distance d between the two CDWs 1606. Depending on the handedness of the input light, the light entering the first CDW 1606a will diffract at a particular angle and at a particular direction between the CDWs, as illustrated. This diffracted light is then input on a substantially identical second CDW 1606b that is rotated 180 degrees about its x-y plane. Once the light interacts with the second CDW 1606b, the light is then diffracted into the original propagation direction, as illustrated, with a specific separation between the left-handed and right-handed polarized beams. This separation is dictated by the CDW separation d, and is also typically governed by a multiplier α. By employing a pair of CDW 1606 as disclosed herein, the image of a given pixel may be shifted by a sub-pixel distance, allowing for more detail in beam direction manipulation in autostereoscopic display systems.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. An autostereoscopic display, comprising:
   a display panel providing stereoscopic imagery;
   a polarization modulator configured to modify polarization of light received from the display panel, wherein the polarization modulator is configured to impart right-handed or left-handed circular polarization on light received from the display panel; and
   a polarization-sensitive beam deflector configured to direct light received from the polarization modulator based on the modified polarization.

2. The autostereoscopic display according to claim 1, wherein the handedness of the left-handed and right-handed circular polarized light corresponds to either left eye or right eye images of the stereoscopic imagery.

3. The autostereoscopic display according to claim 1, wherein the polarization modulator imparts the right-handed or left-handed circular polarization based on corresponding first and second voltages applied to the polarization modulator.

4. The autostereoscopic display according to claim 1, wherein the polarization modulator imparts the right-handed or left-handed circular polarization by imparting a positive or negative approximately quarter-wave phase retardance on linearly polarized light received from the display panel.

5. The autostereoscopic display according to claim 4, wherein the polarization modulator comprises an in-plane switching device that reorients a quarter-wave phase retardance through a right angle substantially symmetrically about the input linear polarization direction.

6. The autostereoscopic display according to claim 4, wherein the polarization modulator comprises two approximately orthogonally oriented quarter-wave modulators.

7. The autostereoscopic display according to claim 4, wherein the polarization modulator comprises an approximately 45° oriented half-wave retarder and an approximately orthogonally oriented passive quarter-wave retarder.

8. The autostereoscopic display according to claim 1, wherein polarization modulator is a liquid crystal modulator.

9. The autostereoscopic display according to claim 1, wherein the polarization-sensitive beam deflector is configured to respectively direct the left-handed and right-handed circular polarized light into either left or right eye viewing regions based on the handedness of the circular polarized light.

10. The autostereoscopic display according to claim 9, wherein the polarization-sensitive beam deflector comprises at least one static cycloidal diffractive waveplate, each comprising diffraction angles determined as a function of wavelength of the left-handed and right-handed circular polarized light.

11. The autostereoscopic display according to claim 9, further comprising a parallax barrier configured to direct alternating left eye and right eye imagery to corresponding left eye and right eye viewing regions.

12. The autostereoscopic display according to claim 9, further comprising a lenslet array configured to direct alternating left eye and right eye imagery to corresponding left eye and right eye viewing regions.

13. The autostereoscopic display according to claim 12, wherein the lenslet array comprises a plurality of vertical lenses configured to direct alternating left eye and right eye imagery to corresponding left eye and right eye viewing regions.

14. The autostereoscopic display according to claim 1, further comprising a linear polarizer configured to linearly polarize light output from the display system, and to provide the linearly polarized light to the polarization modulator.

15. The autostereoscopic display according to claim 1, wherein the display panel comprises an OLED light source.

16. An autostereoscopic display for providing stereoscopic imagery, comprising:
   a display panel providing stereoscopic imagery;
   a polarization modulator configured to impart right-handed or left-handed circular polarization, corresponding to either left eye or right eye images of the stereoscopic imagery, on linearly polarized light received from the display panel; and
   a polarization-sensitive beam deflector configured to respectively direct the left-handed and right-handed circular polarized light into either left or right eye viewing regions based on the handedness of the circular polarized light.

17. The autostereoscopic display according to claim 16, wherein the polarization modulator imparts the right-handed or left-handed circular polarization based on corresponding first and second voltages applied to the polarization modulator.

18. The autostereoscopic display according to claim 16, wherein the polarization modulator imparts the right-handed or left-handed circular polarization by imparting a positive or negative approximately quarter-wave phase retardance on linearly polarized light received from the display panel.

19. The autostereoscopic display according to claim 18, wherein the polarization modulator comprises an in-plane switching device that reorients a quarter-wave phase retardance through a right angle substantially symmetrically about the input linear polarization direction.

20. The autostereoscopic display according to claim 18, wherein the polarization modulator comprises two approximately orthogonally oriented quarter-wave modulators.

21. The autostereoscopic display according to claim 18, wherein the polarization modulator comprises an approximately 45° oriented half-wave retarder and an approximately orthogonally oriented passive quarter-wave retarder.

22. The autostereoscopic display according to claim 16, wherein polarization modulator is a liquid crystal modulator.

23. The autostereoscopic display according to claim 16, wherein the polarization-sensitive beam deflector comprises at least one static cycloidal diffractive waveplate, each comprising diffraction angles determined as a function of wavelength of the left-handed and right-handed circular polarized light.

24. The autostereoscopic display according to claim 16, further comprising a parallax barrier configured to direct alternating left eye and right eye imagery to corresponding left eye and right eye viewing regions.

25. The autostereoscopic display according to claim 16, further comprising a lenslet array configured to direct alternating left eye and right eye imagery to corresponding left eye and right eye viewing regions.

26. The autostereoscopic display according to claim 25, wherein the lenslet array comprises a plurality of vertical lenses configured to direct alternating left eye and right eye imagery to corresponding left eye and right eye viewing regions.

27. The autostereoscopic display according to claim 16, further comprising a linear polarizer configured to linearly polarize light output from the display system, and to provide the linearly polarized light to the polarization modulator.

28. The autostereoscopic display according to claim 16, wherein the display panel comprises an OLED light source.

29. A method of providing stereoscopic imagery, the method comprising:
  receiving light from a display panel configured to provide stereoscopic imagery;
  modulating the polarization of light received from the display panel, wherein modulating the polarization of light received from the display panel comprises imparting right-handed or left-handed circular polarization on light received from a display system providing stereoscopic imagery; and
  directing the modulated light based on the modulated polarization.

30. The method according to claim 29, wherein the handedness of the left- and right-handed circular polarized light corresponds to either left eye or right eye images of the stereoscopic imagery.

31. The method according to claim 29, wherein imparting right-handed or left-handed circular polarization on the linearly polarized light comprises using corresponding positive or negative quarter-wave phase retardance.

32. The method according to claim 29, wherein directing the modulated light based on the modulated polarization comprises directing the left-handed and right-handed circular polarized light respectively into either left or right eye viewing regions based on the handedness of the circular polarized light.

33. The method according to claim 32, wherein directing the left-handed and right-handed circular polarization comprises employing at least one cycloidal diffractive waveplate, each comprising diffraction angles determined as a function of wavelength of the left-handed and right-handed circular polarized light.

34. The method according to claim 29, further comprising directing alternating left eye and right eye imagery to a plurality of corresponding left eye and right eye viewing regions.

35. The method according to claim 29, further comprising linearly polarizing light output from the display panel, and providing the linearly polarized light to the polarization modulator.

* * * * *